(12) United States Patent
Hamann

(10) Patent No.: US 7,219,041 B2
(45) Date of Patent: May 15, 2007

(54) MEASURING AND SIMULATION SYSTEM FOR MACHINE-TOOLS OR PRODUCTION MACHINES

(75) Inventor: Jens Hamann, Fürth (DE)

(73) Assignee: Siemens Aktiengesellschaft, München (DE)

( * ) Notice: Subject to any disclaimer, the term of this patent is extended or adjusted under 35 U.S.C. 154(b) by 470 days.

(21) Appl. No.: 10/800,400

(22) Filed: Mar. 12, 2004

(65) Prior Publication Data

US 2004/0225484 A1 Nov. 11, 2004

(30) Foreign Application Priority Data

Mar. 13, 2003 (DE) ............................ 103 11 027

(51) Int. Cl.
*G06G 7/48* (2006.01)
*G06F 19/00* (2006.01)

(52) U.S. Cl. .................... 703/6; 700/83; 700/180
(58) Field of Classification Search .................. 703/6, 703/22; 700/83, 180; 73/660, 664, 118.1; 318/561, 807
See application file for complete search history.

(56) References Cited

U.S. PATENT DOCUMENTS

| 4,395,904 | A | * | 8/1983 | Ivanov et al. ............ 73/118.1 |
| 4,763,058 | A | * | 8/1988 | Heining et al. ............ 318/807 |
| 6,198,246 | B1 | * | 3/2001 | Yutkowitz .................... 318/561 |
| 6,259,221 | B1 | * | 7/2001 | Yutkowitz .................... 318/561 |
| 6,281,650 | B1 | * | 8/2001 | Yutkowitz .................... 318/561 |
| 7,032,453 | B2 | * | 4/2006 | Flock et al. ..................... 73/664 |
| 2002/0193972 | A1 | * | 12/2002 | Kudo et al. ..................... 703/1 |
| 2004/0144177 | A1 | * | 7/2004 | Flock et al. ..................... 73/660 |

OTHER PUBLICATIONS

Grier, D.A. Graphical Techniques for Output Analysis, Proceedings of the 24th Conference on Winter Simulation, Dec. 1992, ACM Press, pp. 314-319.*
Spence et al., A.D. Parallel Processing for 2-1/2D Machining Simulation, Proceedings of the Sixth ACM Symposium on Solid Modeling and Applications, May 2001, pp. 140-148.*
Spence et al., Intergated Solid Modeler Based Solutions for Machining, Proceddings of the Fifth ACM Symposium on Solid Modeling and Applications, Jun. 1999, pp. 296-305.*
D1. Firmenprospekt K165 der FIDIA S.p.A, Hochgeschwindikeitsbearbeitungszentren, San Mauro Torinese, 2001.

* cited by examiner

*Primary Examiner*—Russell Frejd
(74) *Attorney, Agent, or Firm*—Henry M. Feiereisen

(57) ABSTRACT

A measuring and simulation system for a machine-tool or production machine is described. Measurement results and simulation results are visualized simultaneously side-by-side on a common monitor display screen. A user can then easily set and optimize the control parameters of the machine-tool or production machine by a straightforward comparison between the measurement results and the simulation results.

5 Claims, 1 Drawing Sheet

MEASURING AND SIMULATION SYSTEM FOR MACHINE-TOOLS OR PRODUCTION MACHINES

CROSS-REFERENCES TO RELATED APPLICATIONS

This application claims the priority of German Patent Application, Serial No. 103 11 027.5, filed Mar. 13, 2003, pursuant to 35 U.S.C. 119(a)–(d), the disclosure of which is incorporated herein by reference.

BACKGROUND OF THE INVENTION

The present invention relates to a measuring and simulation system for machine-tools or production machines.

The control parameters of machine tools or production machines can be optimally adjusted with the help of measuring and simulation systems. In the context of this application, the term "production machine" is used in a generic sense and also includes robots which generally follow the concepts outlined here. The parameters are first determined with the help of a simulation system, wherein the simulation system computes, for example, the transfer function and/or of the step response of a rotation speed and/or position control circuit of the machine and visualizes the results to a user on a display screen. The control parameters can then be optimized based on the visualized a data. Simulation systems of this type are typically implemented external to the machine on an external computing device, such as a personal computer or a workstation.

Subsequently, the simulation results are checked with the help of a measuring system that is independent of the simulation system. The measuring system computes the actual transfer function or step response of the rotation speed and/or position control circuits from the actual measurement signals obtained from the sensors and transducers. In modern systems, such measurement systems tend to be implemented as a system component that is integrated in the machine, or as a separate external computing device, such as a personal computer or a workstation.

The fact that the measuring systems and the simulation systems are executed on different computing devices or system components, each of which have a corresponding display screen, and that the results are also displayed on different display screens, makes it difficult for a user to compare the simulated results with the results obtained from the actual measurement.

It would therefore be desirable and advantageous to provide an improved measuring and simulation system for machine tools or production machines, which obviates prior art shortcomings and is able to specifically allow a simple and clear comparison between the measurement results and the simulation results.

SUMMARY OF THE INVENTION

According to one aspect of the present invention, a visualization system for a machine-tool or production machine includes a measuring and simulation system operatively connected to the machine-tool or production machine, wherein the measuring and simulation system simulates a desired response of the machine-tool or production machine using simulation parameters. The measuring and simulation system further measures an actual response of the machine-tool or production machine by using the simulation parameters. The system includes a single display screen for visualizing the desired response and the actual response simultaneous side-by-side on the single display screen.

According to another aspect of the invention, a method for visualizing a simulated and measured response from a machine-tool or production machine includes the steps of simulating a response from the machine-tool or production machine, determining characteristic parameters associated with the simulated response, setting control parameters of the machine-tool or production machine based on the determined characteristic parameters, measuring an actual machine response obtained with the control parameters; and displaying the simulated response and the measured actual response simultaneously side-by-side.

According to yet another aspect of the invention, a measuring and simulation system for a machine-tool or production machine is disclosed, wherein measurement and simulation results are visualized simultaneously side-by-side on a common monitor display screen.

According to an advantageous feature of the invention, the measuring and simulation system is implemented as an integral system component of the machine-tool or production machine. This allows the operator to optimize the control parameters of the machine directly at the location on the machine.

According to another advantageous feature of the invention, the measurement data for the measuring and simulation system can be transmitted via a data bus system or a data network from the machine-tool or production machine to the measuring and simulation system. Having the ability to transfer the measurement data over a data bus system as well as via a data network provides a high degree of flexibility for acquiring data from a measurement and simulation system.

According to yet another advantageous feature of the invention, the measurement data for the measuring and simulation system can be transmitted from the machine-tool or production machine to the measuring and simulation system in the form of analog signals. In this way, any sensor and/or transmitter that outputs an analog signal can be connected directly to the measuring or simulation system.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
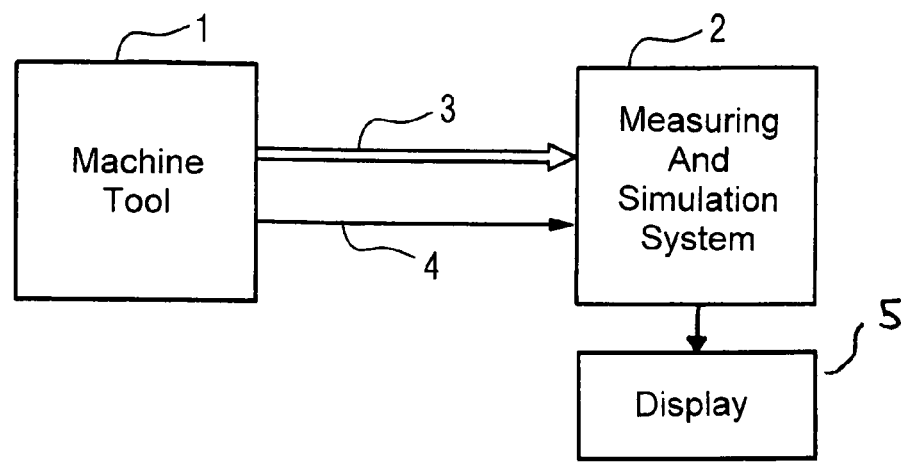
FIG. 1 is a schematic block diagram of a machine tool or production machine connected to a measuring and simulation system.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic block diagram of a machine tool or production machine 1 connected to a measuring and simulation system 2 in accordance with the present invention. The production machine 1 is connected with the measuring and simulation system 2 via a data network 3 and a data line 4 for transmission of data, in particular measurement data from the production machine 1 to the measuring and simulation system 2. Also connected to the measuring and simulation system 2 is a display 5, which will be described in more detail with reference to FIG. 2. The measuring and simulation system 2 can be provided as a single integrated program, or can alternatively be implemented as separate programs, i.e., one program for the measurement system and a separate program for the simulation system. For example, the simulation system can simulate and/or compute rotation speed control circuits, position control circuits and travel paths of workpieces, as well as the associated frequency responses, transfer functions or step responses. As a result of such simulation, for example an amplitude-frequency curve of a rotation speed control circuit can be visualized to a user on a display screen. These amplitude-frequency curves can be used to define optimal control parameters of the machine-tool or production machine 1. For example, a controller that can be parameterized with the determined control parameters and subsequently tested. The measured test data are archived by the measuring system and the transfer functions, step responses and frequency responses of, for example, the rotation speed or position control circuits are computed based on the actually measured data and visualized to the user.

Figure 2:
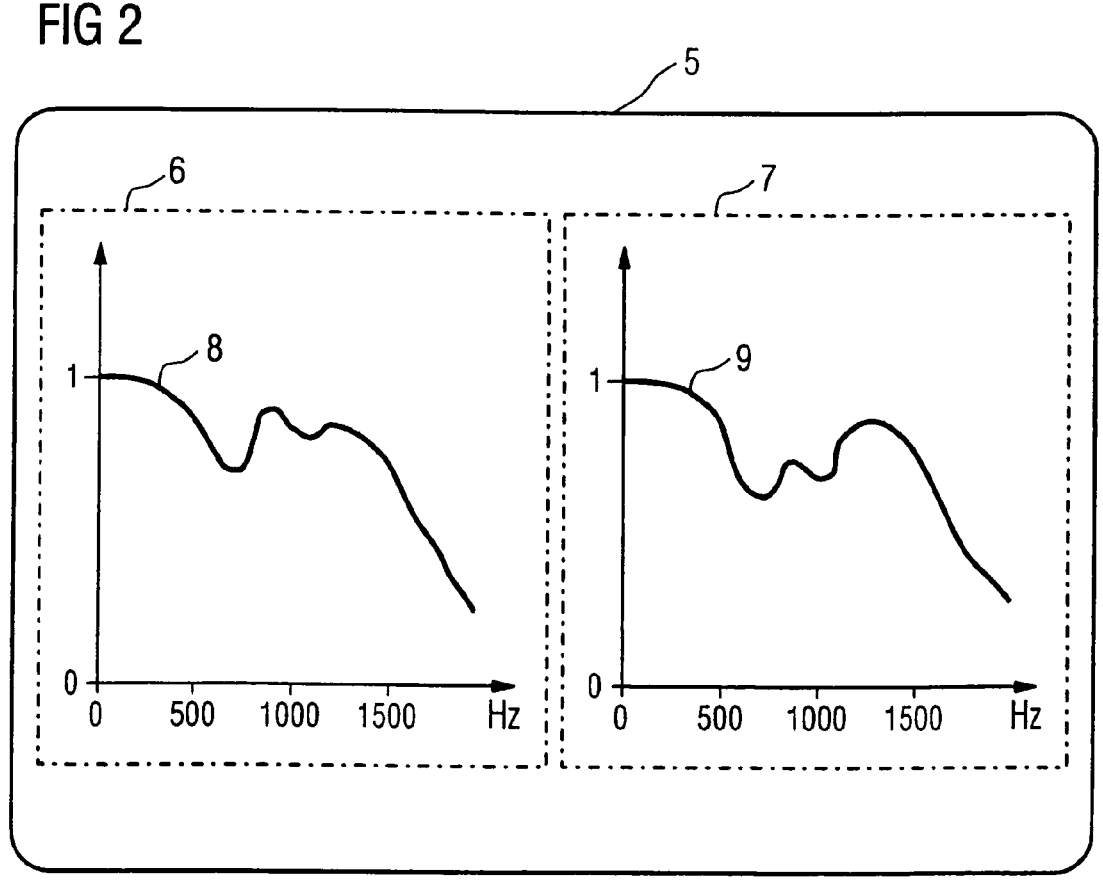
FIG. 2 is a screen display of simulated and actual data according to the invention.

With the system and method of the invention, the user can clearly and directly compare the simulated results with the actually measured results. For this purpose, as illustrated in FIG. 2, the simulated results obtained with the simulation system and the actual results obtained from the measuring system are simultaneously visualized side-by-side on a display screen. The exemplary display screen 5 shows on the left-hand side a measurement window 6 which is enclosed by dotted lines and displays the actual results obtained with the measuring system, whereas the right hand side shows a simulation window 7 that displays the simulated results obtained with the simulation system. The depicted exemplary window displays for sake of illustration and clarity of the drawing in the measurement window 6 a single measured amplitude-frequency response curve 8 of a rotation speed control circuit (not shown), while the simulation window 7 shows a corresponding simulated amplitude-frequency response curve 9 of the same control circuit. The user is hereby able to directly compare the results of the simulation with the results of the actual measurement by visualizing the simulated amplitude-frequency response curve 9 and the actually measured amplitude-frequency curve 8 simultaneously side-by-side on the common display screen 5.

In the exemplary embodiment depicted in FIG. 1, a data network 3 and/or data lines 4 are used to transmit the data from the machine tool or production machine 1 to the measuring and simulation system 2. The data network can be include, for example, FireWire, Ethernet and/or USB interfaces. However, in an alternative approach, the data can also be transmitted from the machine tool or production machine 1 to the measuring and simulation system 2 via a data bus system (e.g., Profibus) instead of via a data network 3, in particular a real-time-enabled data bus system. If data are available in analog form rather than as, e.g., digitized data packets, then these analog signals can be transmitted via the data lines 4 to the measuring and simulation system 2, where the analog signals are inputted to a suitable analog/digital converter.

Furthermore, unlike the afore-described embodiment, where the measuring and simulation system was implemented on a common computing unit which can be separate from the machine and implemented, for example, on a personal computer or a workstation, the measuring and simulation system can also be implemented on two separate computing units, namely a first computing unit for the measuring system and a second computing unit for the simulation system. However, the two separate computing units must then be connected to at least one common display screen for visualizing the results simultaneously side-by-side.

Advantageously, the measuring and simulation system can be integrated as a system component into the machine-tool or production machine. A user can then set and optimize the control parameters directly at the location of the machine tool or production machine without requiring additional hardware.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A visualization system for a machine-tool or production machine, comprising:
   a measuring and simulation system operatively connected to the machine-tool or production machine, said measuring and simulation system simulating a desired response of the machine-tool or production machine using simulation parameters, wherein the desired response defines an amplitude-frequency curve of the machine-tool or production machine, and wherein the simulation parameters are selected from the group consisting of a rotation speed control parameter, a position control parameter, and a travel path of a workpiece,
   a controller generating control parameters with the simulation parameters and using the generated control parameters to control the machine-tool or production machine; and
   a single display screen for visualizing the desired response and a measured actual response of the machine-tool or production machine simultaneously side-by-side on the single display screen in form of amplitude-frequency curves.

2. The system of claim 1, wherein the measuring and simulation system is operatively connected to the machine-tool or production machine by a data link.

3. The system of claim 1, wherein the measuring and display system is implemented as an integral system component of the machine-tool or production machine.

4. The system of claim 2, wherein the measured actual response is transmitted via the data link in form of analog data.

5. A method for visualizing a simulated and measured response from a machine-tool or production machine, comprising the steps of:

providing a simulation system;
simulating with the simulation system a desired response from the machine-tool or production machine, said desired response selected from the group consisting of a rotation speed control parameter, a position control parameter, and a travel path of a workpiece;
determining characteristic parameters associated with the simulated response, said characteristic parameters defining an amplitude-frequency curve of the machine-tool or production machine;

optimizing control parameters for a machine controller of the machine-tool or production machine based on the determined characteristic parameters;
measuring an actual machine response obtained with the control parameters; and
displaying the simulated response and the measured actual response simultaneously side-by-side in the form of amplitude-frequency curves.

* * * * *